(12) United States Patent
Ma et al.

(10) Patent No.: US 11,244,231 B2
(45) Date of Patent: Feb. 8, 2022

(54) QUANTUM-MACHINE TRAINING OF KNOWLEDGE GRAPHS

(71) Applicant: Siemens Aktiengesellschaft, Munich (DE)

(72) Inventors: Yunpu Ma, Munich (DE); Volker Tresp, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 827 days.

(21) Appl. No.: 16/122,528

(22) Filed: Sep. 5, 2018

(65) Prior Publication Data
US 2020/0074316 A1 Mar. 5, 2020

(51) Int. Cl.
| | |
|---|---|
| G06N 5/02 | (2006.01) |
| B82Y 10/00 | (2011.01) |
| G06F 17/18 | (2006.01) |
| G06F 9/50 | (2006.01) |
| G06F 9/38 | (2018.01) |
| G06F 15/16 | (2006.01) |
| G06N 10/00 | (2019.01) |
| G06N 20/00 | (2019.01) |
| G06F 16/901 | (2019.01) |
| G06F 40/30 | (2020.01) |

(52) U.S. Cl.
CPC ............. *G06N 5/022* (2013.01); *B82Y 10/00* (2013.01); *G06F 9/3877* (2013.01); *G06F 9/5027* (2013.01); *G06F 15/16* (2013.01); *G06F 16/9024* (2019.01); *G06F 17/18* (2013.01); *G06F 40/30* (2020.01); *G06N 10/00* (2019.01); *G06N 20/00* (2019.01)

(58) Field of Classification Search
CPC ........ G06N 5/022; G06N 10/00; G06N 20/00; G06N 5/04; G06F 40/30; G06F 16/9024; G06F 9/5027; G06F 9/3877; G06F 17/18; G06F 15/16; B82Y 10/00
USPC .......................................................... 706/46
See application file for complete search history.

(56) References Cited

U.S. PATENT DOCUMENTS

| | | | | |
|---|---|---|---|---|
| 2014/0379323 | A1* | 12/2014 | Anastasakos | G06F 16/3329 704/9 |
| 2018/0075161 | A1* | 3/2018 | Saeed | G06F 16/9024 |
| 2020/0327426 | A1* | 10/2020 | Li | G06F 16/367 |

OTHER PUBLICATIONS

Maximilian Nickel, Volker Tresp, and Hans-Peter Kriegel. A three-way model for collective learning on multi-relational data. 2011.
Kristina Toutanova and Danqi Chen. Observed versus latent features for knowledge base and text inference. In Proceedings of the 3rd Workshop on Continuous Vector Space Models and their Compositionality, pp. 57-66, 2015.
Yunpu Ma, Marcel Hildebrandt, Stephan Baier, and Volker Tresp. Holistic representations for memorization and inference.
Harry Buhrman, Richard Cleve, John Watrous, and Ronald De Wolf. Quan-tum fingerprinting. Physical Review Letters, 87(16):167902, 2001.

(Continued)

*Primary Examiner* — Jonathan Han
(74) *Attorney, Agent, or Firm* — Schmeiser, Olsen & Watts, LLP

(57) ABSTRACT

Various examples generally relate to knowledge graphs including entities and links associated with semantic triples including subject-predicate-object. Various examples specifically relate to quantum-machine learning of knowledge graphs. Further examples relate to a quantum-machine-assisted inference on knowledge graphs.

16 Claims, 6 Drawing Sheets

(56) References Cited

OTHER PUBLICATIONS

Figure 1:
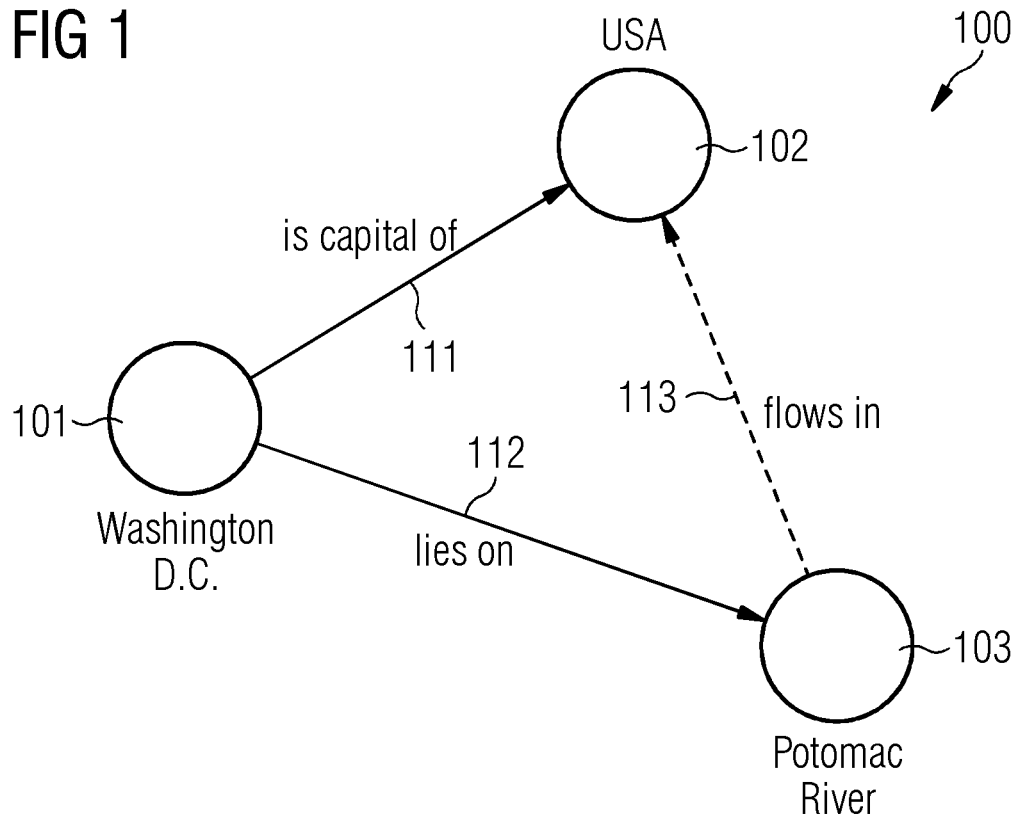

Max F Riedel, Daniele Binosi, Rob Thew, and Tommaso Calarco. The european quantum technologies flagship programme. Quantum Science and Technology, 2(3):030501, 2017.

Andrew M Childs and Nathan Wiebe. Hamiltonian simulation using linear combinations of unitary operations. arXiv preprint arXiv:1202.5822, 2012.

Kalev Leetaru and Philip A. Schrodt. Gdelt: Global data on events, loca-tion, and tone. ISA Annual Convention, 2013.

Juan Carlos Garcia-Escartin and Pedro Chamorro-Posada. Swap test and hong-ou-mandel effect are equivalent. Physical Review A, 87(5):052330, 2013.

Tim Dettmers. Pasquale Minervini, Pontus Stenetorp, and Sebastian Riedel. Convolutional 2d knowledge graph embeddings. arXiv preprint arXiv:1707.01476, 2017.

Antoine Bordes, Nicolas Usunier, Alberto Garcia-Duran, Jason Weston, and Oksana Yakhnenko. Translating embeddings for modeling multirelational data. In Advances in neural information processing systems, pp. 2787-2795, 2013.

Arthur Asuncion and David Newman. Uci machine learning repository, 2007.

Iordanis Kerenidis and Anupam Prakash. Quantum recommendation sys-tems. arXiv preprint arXiv:1603.08675, 2016.

Pedro Chamorro-Posada and Juan Carlos Garcia-Escartin. The switch test for discriminating quantum evolutions. arXiv preprint arXiv:1706.06564, 2017.

Maria Schuld, Alex Bocharov, Krysta Svore, and Nathan Wiebe. Circuit-centric quantum classifiers. arXiv preprint arXiv:1804.00633, 2018.

Bishan Yang, Wen-tau Yih, Xiaodong He, Jianfeng Gao, and Li Deng. Embedding entities and relations for learning and inference in knowledge bases. arXiv preprint arXiv: 1412.6575, 2014.

* cited by examiner

US 11,244,231 B2

QUANTUM-MACHINE TRAINING OF KNOWLEDGE GRAPHS

FIELD OF TECHNOLOGY

Various examples generally relate to knowledge graphs including entities and links associated with semantic triples including subject-predicate-object. Various examples specifically relate to quantum-machine learning of knowledge graphs. Further examples relate to a quantum-machine-assisted inference on knowledge graphs.

BACKGROUND

In recent years, a number of large-scale triple-oriented knowledge graphs have been generated. However, nowadays, the size of knowledge graphs is becoming larger and larger with more and more semantic triples and distinguishable entities recorded in the knowledge graphs. This is because knowledge graphs collect and merge information, e.g. from across the whole Internet. Increasing number of semantic triples and distinguishable entities recorded in the knowledge graphs leads to a dramatically slow training of knowledge graphs, as well as a slow response to the inductive inference tasks on knowledge graphs after training.

SUMMARY

Thus, there is a need for advanced techniques of training knowledge graphs. Specifically, there is a need for techniques which overcome or mitigate at least some of the above-identified drawbacks and restrictions.

This need is met by the features of the independent claims. The features of the dependent claims define embodiments.

A method of training a knowledge graph is provided. The knowledge graph includes links. The links implement a plurality of predicates. The knowledge graph further includes entities. The entities implement a plurality of subjects and a plurality of objects. The plurality of subjects and the plurality of predicates and the plurality of objects form semantic triples. The method includes, for each one of a plurality of semantic triples of labeled training data, determining a respective value function by: preparing a respective subject quantum state representing the respective subject based on a first evolution of a first predefined initial un-superimposed quantum state through a parameterized first quantum circuit, respective values of first parameters of the first quantum circuit depending on the respective subject; and evolving the respective subject quantum state through a respective parameterized second quantum circuit, values of second parameters of the second quantum circuit depending on the respective predicate, to thereby obtain a subject-predicate quantum state; and preparing a respective object quantum state representing the respective object based on a second evolution of a second predefined initial un-superimposed quantum state through a parameterized third quantum circuit, values of the third parameters of the third quantum circuit depending on the respective object; and determining a respective overlap between the respective object quantum state and the respective subject-predicate quantum state. The method further includes performing an iterative optimization of the value functions of the plurality of semantic triples based on a loss function defined with respect to a difference between the value functions and the labels of the labeled training data.

A quantum machine is configured for training a knowledge graph. The knowledge graph includes links. The links implement a plurality of predicates. The knowledge graph further includes entities. The entities implement a plurality of subjects and a plurality of objects. The plurality of subjects and the plurality of predicates and the plurality of objects form semantic triples. The quantum machine is configured to execute, for each one of a plurality of semantic triples of labeled training data, determining a respective value function by: preparing a respective subject quantum state representing the respective subject based on a first evolution of a first predefined initial un-superimposed quantum state through a parameterized first quantum circuit, respective values of first parameters of the first quantum circuit depending on the respective subject; and evolving the respective subject quantum state through a respective parameterized second quantum circuit, values of second parameters of the second quantum circuit depending on the respective predicate, to thereby obtain a subject-predicate quantum state; and preparing a respective object quantum state representing the respective object based on a second evolution of a second predefined initial un-superimposed quantum state through a parameterized third quantum circuit, values of the third parameters of the third quantum circuit depending on the respective object; and determining a respective overlap between the respective object quantum state and the respective subject-predicate quantum state. The quantum machine is configured to execute performing an iterative optimization of the value functions of the plurality of semantic triples based on a loss function defined with respect to a difference between the value functions and the labels of the labeled training data.

A method of training a knowledge graph is provided. The knowledge graph includes links implementing a plurality of predicates and further includes entities implementing a plurality of subjects and a plurality of objects. The plurality of subjects and the plurality of predicates and the plurality of objects form semantic triples. The method includes, for each one of a plurality of semantic triples of labeled training data, determining a respective value function by: preparing a respective subject quantum state representing the respective subject based on a classical representation of the respective subject; and evolving the respective subject quantum state through a respective parameterized quantum circuit, values of parameters of the quantum circuit depending on the respective predicate, to thereby obtain a subject-predicate quantum state; and preparing a respective object quantum state representing the respective object based on a further classical representation of the respective object; and determining a respective overlap between the respective object quantum state and the respective subject-predicate quantum state. The method further includes performing an iterative optimization of the value functions of the plurality of semantic triples based on a loss function defined with respect to a difference between the value functions and the labels of the labeled training data.

A quantum machine is configured for training a knowledge graph. The knowledge graph includes links. The links implement a plurality of predicates. The knowledge graph further includes entities. The entities implement a plurality of subjects and a plurality of objects. The plurality of subjects and the plurality of predicates and the plurality of objects form semantic triples. The quantum machine is configured to execute, for each one of a plurality of semantic triples of labeled training data, determining a respective value function by: preparing a respective subject quantum state representing the respective subject based on a classical representation of the respective subject; and evolving the respective subject quantum state through a respective parameterized quantum circuit, values of parameters of the quantum circuit depending on the respective predicate, to thereby obtain a subject-predicate quantum state; and preparing a respective object quantum state representing the respective object based on a further classical representation of the respective object; and determining a respective overlap between the respective object quantum state and the respective subject-predicate quantum state. The quantum machine is configured to execute performing an iterative optimization of the value functions of the plurality of semantic triples based on a loss function defined with respect to a difference between the value functions and the labels of the labeled training data.

It is to be understood that the features mentioned above and those yet to be explained below may be used not only in the respective combinations indicated, but also in other combinations or in isolation without departing from the scope of embodiments of the invention.

BRIEF DESCRIPTION

Figure 2:
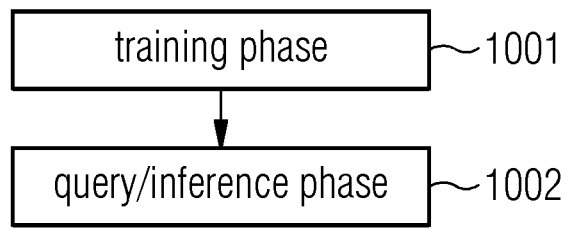
Figure 3:
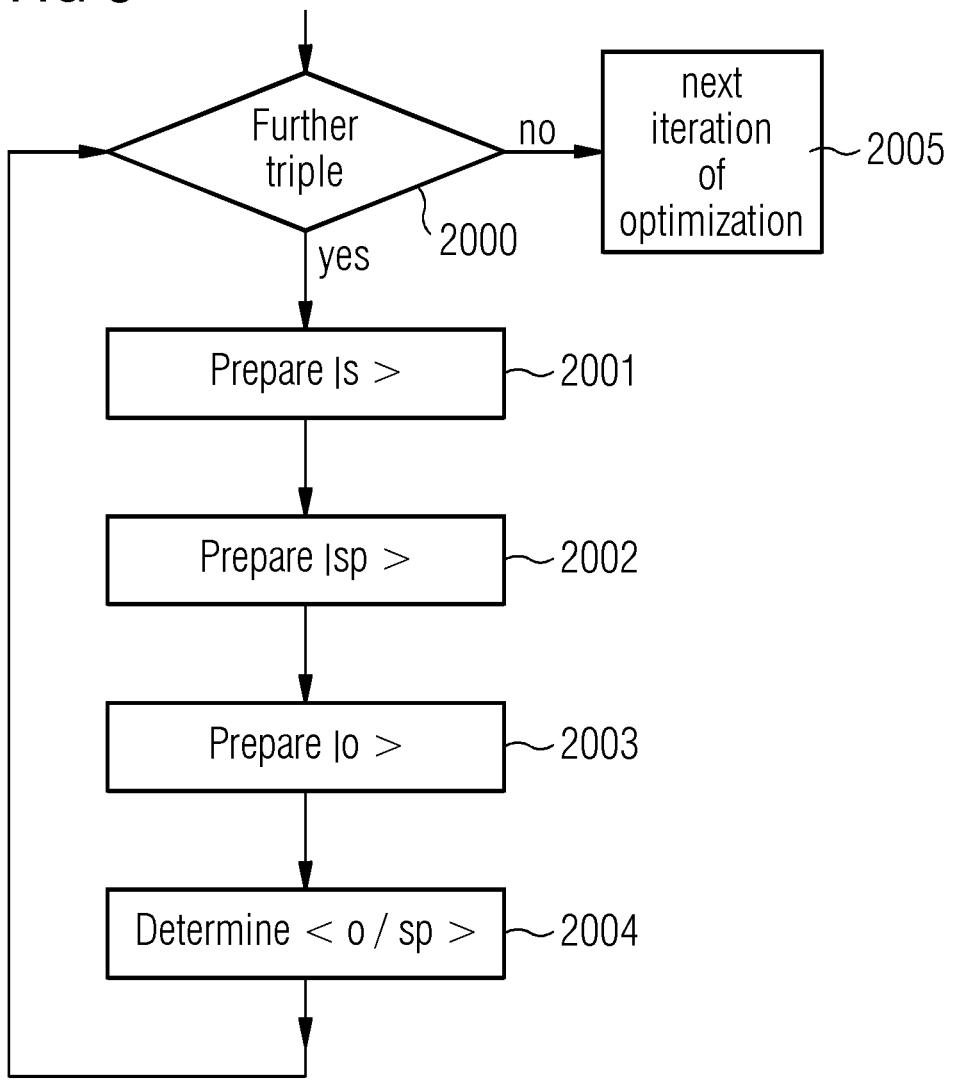
Figure 4:
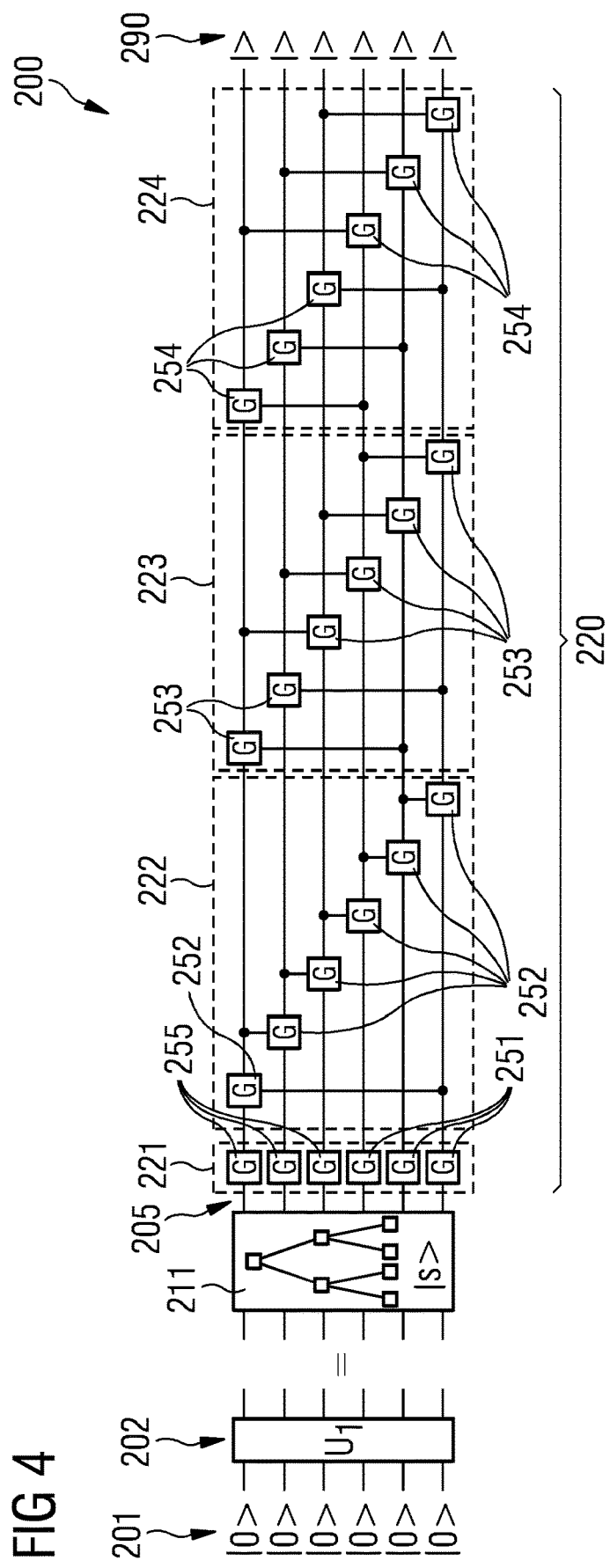
Figure 5:
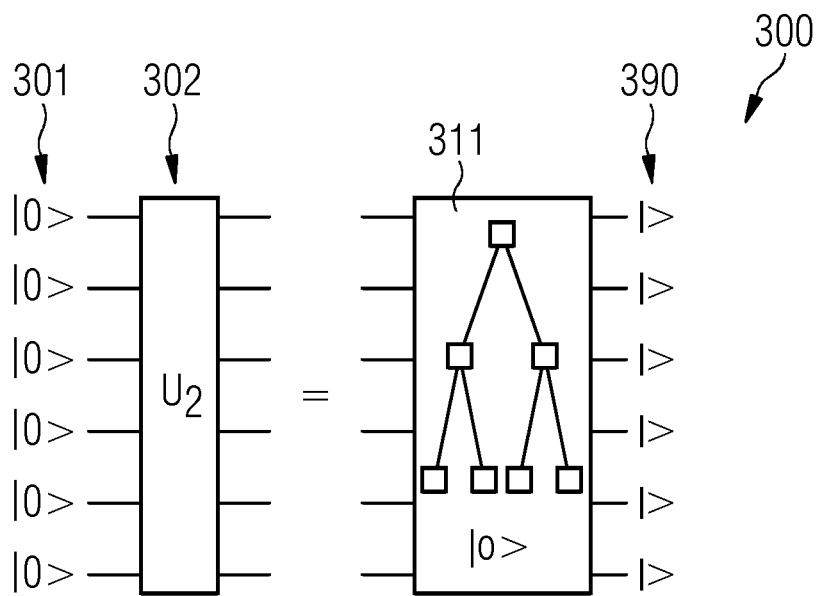
Figure 6:
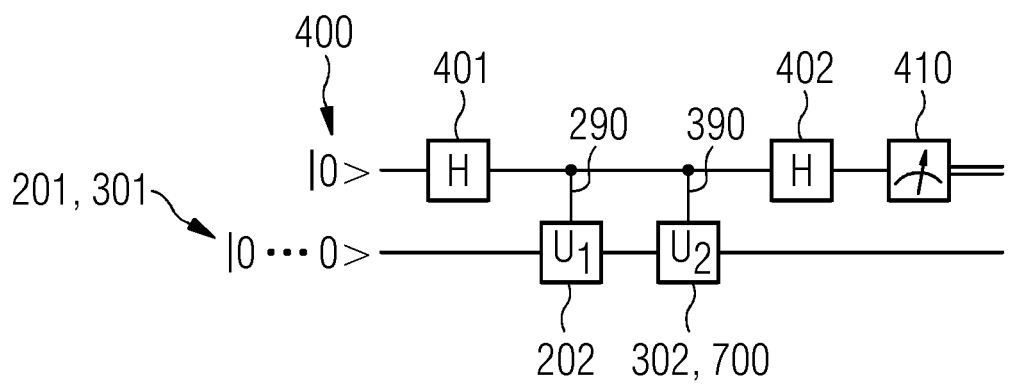
Figure 7:
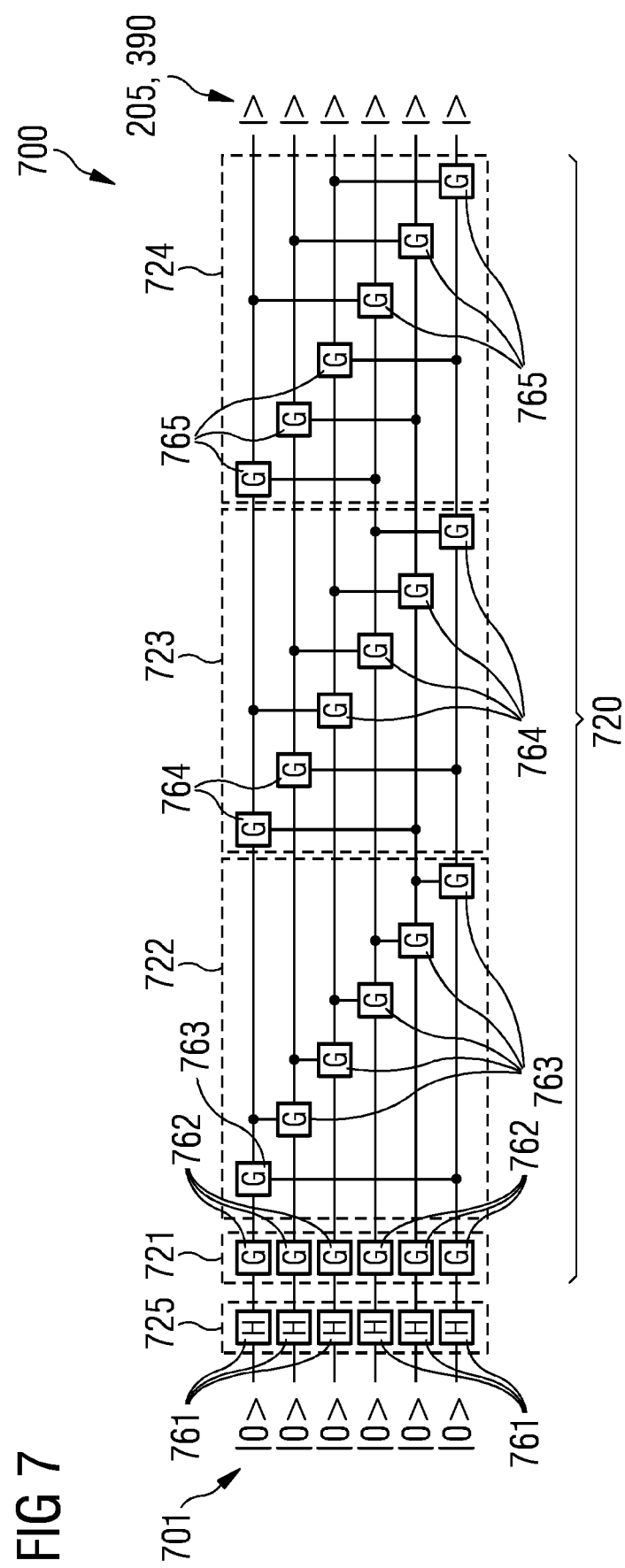

Some of the embodiments will be described in detail, with reference to the following figures, wherein like designations denote like members, wherein:

FIG. 1 schematically illustrates a knowledge graph including entities and links representing subjects, predicates and objects, respectively, according to various examples;

FIG. 2 schematically illustrates a training phase and a query/inference phase of a knowledge graph according to various examples;

FIG. 3 schematically illustrates a method according to various examples that can be used to implement the training of the knowledge graph using a quantum machine according to various examples;

FIG. 4 schematically illustrates a quantum circuit;

FIG. 5 schematically illustrates a quantum circuit;

FIG. 6 schematically illustrates an ancilla qubit and a module for measuring statistics on the ancilla qubit;

FIG. 7 schematically illustrates a quantum circuit; and

Figure 8:
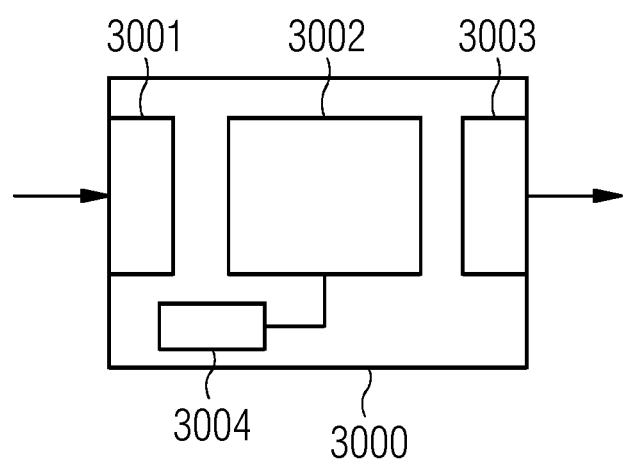

FIG. 8 schematically illustrates a quantum machine.

DETAILED DESCRIPTION

In the following, embodiments of the invention will be described in detail with reference to the accompanying drawings. It is to be understood that the following description of embodiments is not to be taken in a limiting sense. The scope of embodiments of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art Hereinafter, techniques with respect to knowledge graphs (KGs) are described. KGs generally include entities or nodes; and links or references in-between the entities. An example KG is illustrated in FIG. 1.

FIG. 1 illustrates aspects with respect to a KG 100. The KG 100 includes entities 101-103. The KG 100 includes links 111-112 (also referred to as edges) defining relations between the entities 101-103.

The entities 101-103 and the links 111-112 implement semantic triples, wherein each triple includes a subject, a predicate, and an object. For example, the entities 101-102, together with the link 111, implement the semantic triple "Washington D.C. is the capital of the United States of America", or in triplet format (Washington D.C., capital of, USA). Labeled training data can define semantic triples that are known to be true, e.g., the above-identified semantic triple defining that Washington D.C. is the capital of the USA.

Various techniques described herein relate to the training of KGs. By training a KG, it becomes possible to predict missing links (cf. FIG. 1: missing link 113, "Potomac River flows in the USA"), i.e., KG completion. Other goals of training include clustering of entities to reduce the complexity and predicting properties of entities. Some examples of training KGs are described in: Nickel, Maximilian, et al. "A review of relational machine learning for knowledge graphs." Proceedings of the IEEE 104.1 (2016): 11-33.

As illustrated in FIG. 2, once the KG has been trained in a training phase 1001, the KG 100 can be queried in a subsequent query/inference phase 1002. For example, an inference task may be implemented in the query/inference phase: here, the subject and the predicate are given, and the object is identified, or vice versa.

Various techniques described herein apply quantum machines to facilitate the training of KGs 100 in the training phase 1001. Also, some techniques use quantum machines to facilitate the query of the KGs 100 in the query/inference phase 1002.

Generally speaking, quantum machines exploit quantum-mechanical phenomena such as superposition of quantum bits (qubits) or entanglement of qubits. Qubits can be superimposed in multiple states, if compared to classical binary bits that are either zero or one. Example quantum machines include the Noisy Intermediate-Scale Quantum (NISQ) devices, see Preskill, John. "Quantum Computing in the NISQ era and beyond." arXiv preprint arXiv:1801.00862 (2018).

Quantum-machine learning algorithms as described herein are used to accelerate training and/or inference tasks.

Representation Learning of KGs

Let E denotes the set of entities, and P the set of predicates. Let $N_e$ be the number of entities in E, and $N_p$ the number of predicates in P.

Given a predicate $p \in P$, $\Phi_p: \varepsilon \times \varepsilon \to \{1, 0\}$ the indicator function indicates whether a triple $(\bullet, p, \bullet)$ is true or false. Moreover, $R_p$ denotes the set of all subject-object pairs, such that $\emptyset_p = 1$. The entire KG can be written as $\chi = \{(i, j, k)\}$, with $i=1, \ldots, N_e$, $j=1, \ldots, N_p$, and $k=1, \ldots, N_e$. We assume that each entity and predicate has a unique latent representation. Let $\alpha_{e_i}$, $i=1, \ldots, N_e$, be the representations of entities, and $\alpha_{p_i}$, $i=1, \ldots, N_p$, be the representations of predicates. Note that $\alpha_{e_i}$ and $\alpha_{p_i}$ could be real- or complex-valued vectors/matrices.

A probabilistic model for the $KG_\chi$ is defined as $Pr(\Phi_p(s, o)=1 | A) = \sigma(\eta_{spo})$ for all (s, p, o)-triples x, where $A = \{\alpha_{e_i}\}_i^{N_e} \cup \{\alpha_{p_i}\}_i^{N_p}$ denotes the collection of all embeddings; $\sigma(\bullet)$ denotes the sigmoid function; and $\eta_{spo}$ is the value function of latent representations, $a_s$, $a_p$ and $a_o$. Given a labeled dataset containing both true and false triples $\mathcal{D} = \{(x_i, y_i)\}_{i=1}^m$ with $x_i \in \chi$, and $y_i \in \{1, -1\}$, latent representations can be learned. Commonly, one minimizes the regularized logistic loss $$\min_{\mathcal{A}} \sum_{i=1}^m \log(1 + \exp(-y_i \eta_{x_i})) + \lambda \|\mathcal{A}\|_2^2, \quad (1)$$

where m is the number of training samples, and $\lambda$ is the regularization parameter; $p_i := \sigma(\eta_{x_i})$ with $\sigma(\bullet)$ being the sigmoid function Another valid loss function is the regularized mean squared error (MSE) loss $$\frac{1}{m} \sum_{i=1}^{m} (y_i - \eta_{x_i})^2 + \lambda \|\mathcal{A}\|_2^2. \tag{2}$$

The value function $\eta_{spo}$ is defined differently in various models.

For instance, for RESCAL [11] entities are represented as unique R-dimensional real-valued vectors, $\alpha_{e_i} \in \mathbb{R}^R$, $i=1, \ldots, N_e$, and predicates are represented as matrices, $\alpha_{p_i} \in \mathbb{R}^{R \times R}$, $i=1, \ldots, N_p$. Moreover, the value function is defined as $\eta_{spo} = \alpha_s^T \alpha_p \alpha_o$. For DistMult [15], $\alpha_{e_i}$, $\alpha_{p_j} \in \mathbb{R}^R$, with $i=1, \ldots, N_e$, $j=1, \ldots, N_p$; $\eta_{spo} = \langle \alpha_s, \alpha_p, \alpha_o \rangle$ where $\langle \bullet, \bullet, \bullet \rangle$ denotes the tri-linear dot product.

According to the various techniques described herein, it is possible to model the latent representations of subjects, predicates, and objects using quantum-computing techniques. For example, these representations could be implemented by preparing a respective quantum state having associated coefficients; or respective parameterized quantum circuits, wherein parameters of the quantum circuits have associated values.

Basics of Quantum Computing

Variational unitary circuits are described. A quantum circuit U composed of L unitary operations can be decomposed into a product of unitary matrices $$U = U_L \ldots U_l \ldots U_1,$$

where each $U_l$ indicates either a unitary operation on one qubit or a controlled two-qubit gate acting on 2 qubits. Since a single qubit gate can be treated as a 2×2 unitary matrix from SU(2), we apply the following parameterization.

$$G(\alpha, \beta, \gamma) = \begin{pmatrix} e^{i\beta} \cos\alpha & e^{i\gamma} \sin\alpha \\ -e^{-i\gamma} \sin\alpha & e^{-i\beta} \cos\alpha \end{pmatrix}, \tag{3}$$

where $\{\alpha, \beta, \gamma\}$ are the only trainable parameters of the gate. Note that a global phase factor is neglected. Eq. (3) corresponds to a rotation in 2-D Hilbert space.

Furthermore, a controlled parameterized two-qubit gate can be used as the two-qubit unitary operation. The controlled gate $C_i(G_j)$ acts on the j-th qubit conditioned on the state of the i-th qubit, which can be written as $$C_i(G_j) |x\rangle_i \otimes |y\rangle_j = |x\rangle_i = |x\rangle_i \otimes G_j^x |y\rangle_j,$$

where $|x\rangle$, $|y\rangle$ denote the states of i-th and j-th qubit, respectively.

With unitary gates G and C(G), one can describe the quantum circuit model $U_\theta$ with parameterization $\theta$ in more details. Consider a n qubits entangled quantum state, suppose that $U_l$ is a single qubit gate acting on the k-th qubit, then it can be written as $$U_l = \mathbb{1}_1 \otimes \ldots \otimes G_k \otimes \ldots \otimes \mathbb{1}_n.$$

If $U_l$ is a controlled two-qubit gate acting on the j-th qubit and conditioned on the i-th qubit, $U_l$ would have the following matrix representation $$U_l = \underbrace{\mathbb{1}_1 \otimes \ldots \otimes \mathbb{P}_0}_{i\text{-th}} \otimes \ldots \otimes \underbrace{\mathbb{1}_j}_{j\text{-th}} \otimes \ldots \otimes \mathbb{1}_n +$$

$$\underbrace{\mathbb{1}_1 \otimes \ldots \otimes \mathbb{P}_1}_{i\text{-th}} \otimes \ldots \otimes \underbrace{G_j}_{j\text{-th}} \otimes \ldots \otimes \mathbb{1}_n,$$

where $$\mathbb{P}_0 = \begin{pmatrix} 1 & 0 \\ 0 & 0 \end{pmatrix} \text{ and } \mathbb{P}_1 = \begin{pmatrix} 0 & 0 \\ 0 & 1 \end{pmatrix}$$

EXAMPLE 1

Quantum Circuit Embedding

The following description gives a first example of implementing training using quantum computing. This first example is labelled Quantum Circuit Embedding (QCE). A high-level description of QCE is illustrated in connection with the flowchart of FIG. 3. For example, the method of FIG. 3 could be implemented on a quantum machine having multiple programmable quantum gates that can form a quantum circuit.

In detail, for each one of a plurality of semantic triples (s, p, o) of labeled training data (block 2000), a value function is determined by: preparing a respective subject quantum state (block 2001) representing the respective subject based on a classical representation of the respective subject; evolving the respective subject quantum state through a respective parameterized quantum circuit, values of parameters of the quantum circuit depending on the respective predicate, to thereby obtain a subject-predicate quantum state (block 2002); and preparing a respective object quantum state representing the respective object based on a further classical representation of the respective object (block 2003). Then, a respective overlap between the respective object quantum state and the respective subject-predicate quantum state is determined (block 2004). This overlap corresponds to the value function.

Once the value functions have been determined for all semantic triples (multiple executions of blocks 2000-2004), the next iteration of an outer-loop iterative optimization can commence at block 2005. In this regard, the method further comprises performing an iterative optimization of the value functions of the plurality of semantic triples based on a loss function defined with respect to a difference between the value functions and the labels of the labeled training data and the gradients of respective parameters in QCE.

In QCE entities are represented by unique R-dimensional latent features. Without loss of generality, we assume $R = 2^r$. In this way, a R-dimensional latent vector can be associated to an entangled state of a r-qubit quantum system.

One significant barrier to the quantum learning algorithms is the efficient preparation of quantum sates which amounts to efficient read-in of classical data by the quantum system. Therefore, we further restrict the representations for entities to be real-valued, and stored as classical data in a tree structure T. A technique developed in [8] can be utilized now, which has quantum access to the classical data structure T and can efficiently prepare the quantum state corresponding to the latent features. Thus, the quantum sates for subjects and objects are prepared from respective classical representations. The computation complexity of the quantum state preparation is reduced to the logarithmic in terms of R. In summary, for QCE, entities are defined as $\alpha_{e_i} \in \mathbb{R}^R$, with normalized l2-norm $\|a_{e_i}\|_2=1$, for $i=1, \ldots, N_e$.

On the other hand, in QCE each predicate p corresponds to a specific executable quantum circuit which is composed of sequential implementations of variational gates. Thus, each predicate has a R×R unitary matrix representation $U_p(\theta_p)$, where $\theta_p$ are the predicate-specific trainable parameters from variational quantum gates. Moreover, we treat the circuit architecture, e.g., the placement and the order of quantum gates, for modeling predicates as fixed. Therefore, each predicate is uniquely determined by the circuit parameterizations $\theta_p$.

Give a semantic triple (s, p, o), how the indicator function $\eta_{spo}$ is defined in the quantum model? As a reminder, in The RESCAL model, the indicator function $\eta_{spo}$ can be seen as the dot product of two vectors $a_{sp}$ and $a_o$, where $a_{sp} := a_s^T a_p$. The loss function encourages the two vectors $a_{sp}$ and $a_o$ to point in the same direction if the given semantic triple is genuine, otherwise in opposite directions.

We consider the quantity $\eta_{spo}^{QCE} := \Re \langle o|U_p(\theta_p)|s\rangle$. This quantity is the real part of the inner product of two quantum states, i.e. an object quantum state, $|o\rangle$ and a subject-predicate quantum state $|sp\rangle := U_p(\theta_p)|x\rangle$ generated by separate unitary quantum circuits $|s\rangle$. The model is optimized by maximizing the inner product given the genuine triples and penalizing it for the false triples. The rigorous connection between $\eta_{spo}^{QCE}$ and the label of the triple (s, p, o) will be specified later.

We explain the circuit architecture in more details. Latent features of subject $a_s$ and object $a_o$ are encoded in the subject and object quantum states $|s\rangle$ and $|o\rangle$, respectively via the quantum access to $\mathcal{T}$. The dimension of features is set to R=64 for the following experiments, which corresponds to a 6-qubit quantum system. Next, a unitary parameterized quantum circuit $U_p(\theta_p)$ corresponding to the predicate p evolves $|s\rangle$ to the state $U_p(\theta_p)|s\rangle$.

We design the parameterized quantum circuit for predicates out of four building blocks, each block consists of variational gates or controlled gates operating on each of the 6 qubits. To be more specific, the first block are single qubit transformations using various single qubit gates, and the rest of blocks are controlled two-qubit gates with control range 1, 2, 3, respectively. Thus, the unitary circuit associated to the predicates can be written as $U_{pi}(\theta_{pi}) = U_4 U_3 U_2 U_1$, with $i=1, \ldots, N_p$, where $$U_1 = G_6 G_5 G_4 G_3 G_2 G_1$$

$$U_2 = C_6(G_1) C_1(G_2) C_2(G_3) C_3(G_4) C_4(G_5) C_5(G_6)$$

$$U_3 = C_5(G_1) C_6(G_2) C_1(G_3) C_2(G_4) C_3(G_5) C_4(G_6)$$

$$U_4 = C_4(G_1) C_5(G_2) C_6(G_3) C_1(G_4) C_2(G_5) C_3(G_6) \quad (4)$$

Note that the index for predicate was neglected, since we assume that the circuit architecture is fixed for all the predicates. FIG. 4 displays the circuits for preparing the states $|o\rangle$ and $|sp\rangle$.

FIG. 4 illustrates aspects with respect to a quantum machine system 200 that is used to prepare the subject predicate quantum state 290. The system 200 includes a module 202 that operates based on a predefined initial un-superimposed quantum state 201. The initial un-superimposed quantum state 201 is transferred into the subject quantum state 205 via quantum access to the classical data structure 211, i.e., using a classical data structure 211, e.g., implemented in tree structure. Then, the subject quantum state 205 is evolved through a parametrized quantum circuit 220 that includes multiple blocks 221-224. The block 221 includes multiple single qubit gates 251, while each of the blocks 222-224 includes multiple 2-qubit gates, e.g., in the case of block 221 with the range 1 and in case of block 222 with range 2 and in case of block 223 with range 3. As a general rule, the count and sequence of the blocks 221-224 for the parametrized quantum circuit 220 can vary from implementation to implementation.

The $U_1$ model 200 encodes latent features of the subject s as the subject quantum state $|s\rangle$ 205. The quantum circuit 220 associated to the predicate p maps this ket state 205 to another ket state $U_p(\theta_p)|s\rangle$, i.e., the subject-predicate quantum state 290. For all the following experiments, we set—as an example concrete implementation—the dimension of entity latent features as R=64, which corresponds to a 6-qubit system. Moreover, the circuit architecture of the quantum circuit 220 for all predicates is fixed, and it can be decomposed as four blocks: single qubit gates 251, controlled two-qubit gates 252, 253, 254 with control range 1, 2, and 3, respectively. The tree structure represents the quantum algorithm for accessing the classical data structure $\mathcal{T}$.

FIG. 5 illustrates aspects with respect to a quantum machine system 300 that is used to prepare the object quantum state 390. 301 corresponds to 201. 302 corresponds to 202. And 311 corresponds to 211.

The next thing to show is how the value $\eta_{spo}^{QCE}$ can be measured physically, and how the overlap between the subject-predicate quantum state and the object quantum state is related to the value function. Some of these techniques are generally based on the SWAP test for discriminating two quantum states. The SWAP test was originally proposed for quantum fingerprinting [3], it was further developed in [7, 4] for discriminating quantum evolution operators.

The basic idea is illustrated in FIG. 6. Consider two unitary operations $U_1$ and $U_2$ (cf. FIG. 4, module 202; and FIG. 5, module 302) which can operate on a pure state $|0\rangle := |0 \ldots 0\rangle$ (i.e., not superimposed) conditioned on the state of the ancilla qubit 400 after applying the Hadamard gate 401 on the initial state |0> of the ancilla qubit 400. In particular, the quantum state becomes $U_1|0\rangle$ if the ancilla qubit is $|1\rangle_A$ and $U_2|0\rangle$ if it is in state $|0\rangle_A$. Before observing the ancilla qubit, the underlying quantum state of the whole system reads $$\frac{1}{\sqrt{2}}(|0\rangle_A U_2|0\rangle + |1\rangle_A U_1|0\rangle).$$

As a general rule, the ancilla qubit may have an a-prior known pure (un-superimposed) quantum state.

A second Hadamard gate 402 acting on the ancilla qubit brings the state to

½[$|0\rangle_A(|o\rangle+|sp\rangle)+|1\rangle_A(|o\rangle-|sp\rangle)$].

As a general rule, the Hadamard gate prepares a super-imposed quantum state from an initial, non-superimposed state.

Given the triplet (s,p,o) and the access to the parameters, the above procedure will prepare the following quantum state:

½[$|0\rangle_A(|o\rangle+|sp\rangle)+|1\rangle_A(|o\rangle-|sp\rangle)$].

Therefore, the probability of sampling the ancilla qubit in state $|0\rangle_A$ is $$Pr(|0\rangle_A) = \frac{1}{2} + \frac{1}{2}\Re\langle o|sp\rangle = \frac{1}{2} + \frac{1}{2}\eta_{spo}, \quad (5)$$

while the probability in state $|1\rangle_A$ is $$PR(|1\rangle_A) = \tfrac{1}{2} - \tfrac{1}{2}\Re\langle o|sp\rangle = \tfrac{1}{2} - \tfrac{1}{2}\eta_{spo}, \quad (6)$$

where we temporarily neglect the superscript of the indicator function. As we can see, now the value $\eta_{spo}$ is related to the statistics of sampled quantum sates of the ancillary qubit (measured at block 410) by $$\eta_{spo} = 2PR(|0\rangle_A) - 1 = 1 - 2Pr(|1\rangle_A). \quad (7)$$

Thus, by measuring the statistics of the ancilla qubit 400, it is possible to determine the overlap between the subject-predicate quantum state 290 and the object quantum state 390. Eq. 7 gives the value function.

Generally, this value function can be subject to optimization, in view of a loss function.

With $x_i \in \chi$, the loss function is defined as mean squared error $$\mathcal{L} = \frac{1}{m}\sum_{i=1}^{m}(y_i - \eta_{x_i}^{QCE})^2. \quad (8)$$

In the QCE example and the following example quantum model, fQCE, labels of semantic triples are set as $y_i \in \{1, -1\}$. One may also notice that for the quantum model the loss function is not regularized with respect to the parameters of the model. Due to the unitary restriction on the evolution of quantum circuits, hidden states are automatically normalized. Therefore, l2 norm will not affect either the norm of embedding vectors or the generalization ability of the quantum model.

Having the loss function, the model is optimized by updating parameters using gradient descent technique. Parameters in the variational gates can be efficiently estimated with a hybrid gradient descent scheme generally introduced in [13]. Derivative of Eq. 8 with respect to the gates parameter reads $$\frac{\partial \mathcal{L}}{\partial \theta} = \frac{2}{m}\sum_{i=1}^{m}(\eta_{x_i}^{QCE} - y_i)\frac{\partial}{\partial \theta}\eta_{x_i}^{QCE}, \quad (9)$$

where $\partial \in \{\alpha_{o_i}, \beta_{p_i}, \gamma_{p_i}\}$, with $i = 1 \ldots, N_p$.

The techniques developed in [5, 13] allow the above partial derivate—i.e., the gradient—to be estimated from the states statistics of the ancilla qubit. This is because the derivate of a variational gate can be written as a linear combination of gates with shifted parameters. In particular, we have the following derivatives for the single qubit gates $$\frac{\partial}{\partial_\alpha} G(\alpha, \beta, \gamma) = G\left(\alpha + \frac{\pi}{2}, \beta, \gamma\right) \quad (9A)$$

$$\frac{\partial}{\partial_\beta} G(\alpha, \beta, \gamma) = \frac{1}{2}G\left(\alpha, \beta + \frac{\pi}{2}, 0\right) + \frac{1}{2}G\left(\alpha, \beta + \frac{\pi}{2}, \pi\right)$$

$$\frac{\partial}{\partial_\gamma} G(\alpha, \beta, \gamma) = \frac{1}{2}G\left(\alpha, 0, \gamma + \frac{\pi}{2}\right) + \frac{1}{2}G\left(\alpha, \pi, \gamma + \frac{\pi}{2}\right)$$

Moreover, partial derivatives of two-qubit gates can be written as a combination of control gates with shifted gates' parameters. More details on the hybrid gradient descent approach can be found in Section 4 of [13].

For QCE, this can be employed if the gradient is oriented with respect to the predicates. For this, the parameters of the quantum circuit 220 (cf. FIG. 4) are altered according to Eq. 9 and Eq. 9A.

For the gradient oriented with respect to subject or object, the respective gradient is calculated using a classical representation of the respective entities.

This is based on the finding that the technique of estimating the derivatives with respect to the gates parameters cannot be applied to the estimation of gradient with respect to the elements of latent features (namely, $\alpha_{e_i}$) defined in the QCE, since the derivative of state vector is not necessarily normalized and unitary. Another caveat is that even if one could estimate the gradients with respect to the latent features, the entire classical data structure $\mathcal{T}$ needs to be updated after only one step of optimization due to the normalization constraints. This leads to a computational overhead of $\vartheta(R^2)$ for even just one update of $\alpha_{e_i}$, with $i = 1, \ldots, N_e$. In order to overcome the disadvantages of the QCE, here we introduce a fully-parameterized Quantum Circuit Embedding (FQCE) model.

EXAMPLE 2

Fully-Parameterized Quantum Circuit Embedding

Instead of writing entity representations as normalized R-dimensional vectors—as in QCE—, entity representations are obtained through unitary circuit evolution applied to some initial un-superimposed quantum states. In this way, each entity is uniquely specified by the—unitary circuit architecture and the parameters of the unitary circuit of the respective entity, similar to the circuits definition of predicates—in QCE.

These techniques are labeled fully-parameterized QCE (fQCE), hereinafter. fQCE, hence, does not determine the subject quantum state and the object quantum state based on a classical representation of the subject and the object (cf. FIG. 4 and FIG. 5, modules 211, 311).

Compared to the QCE, the advantages of fQCE approach are the followings. First, latent features do not need to be loaded from a classical data structure and encoded as coefficients of quantum states, they are generated directly from the unitary evolution. Second, the fQCE can be optimized quickly, since the only parameters that need to be updated are the variational gates parameters. Thus, techniques explained in the last subsection can be applied to accelerate the optimization.

As a general rule, also for the fQCE example, the method of FIG. 3 can be employed. Here, blocks 2001 and 2003 are implemented differently for fQCE than for QCE.

In detail, for each one of a plurality of semantic triples of labeled training data (block 2000), the respective value function is determined by: preparing (block 2001) a respective subject quantum state representing the respective subject based on a first evolution of a first predefined initial un-superimposed quantum state through a parameterized first quantum circuit, respective values of first parameters of the first quantum circuit depending on the respective subject; and evolving the respective subject quantum state through a respective parameterized second quantum circuit, values of second parameters of the second quantum circuit depending on the respective predicate, to thereby obtain a subject-predicate quantum state (block 2002); and preparing (block 2003) a respective object quantum state representing the respective object based on a second evolution of a second predefined initial un-superimposed quantum state through a parameterized third quantum circuit, values of the third parameters of the third quantum circuit depending on the respective object. Blocks 2004 and 2005 are implemented as described above with respect to QCE. Hence, a respective overlap between the respective object quantum state and the respective subject-predicate quantum state is determined (block 2004). Also, an iterative optimization of the value functions of the plurality of semantic triples based on a loss function defined with respect to a difference between the value functions and the labels of the labeled training data is performed (block 2005).

The system 700 for generation quantum representations of entities—i.e., the subject quantum state 205 and the object quantum state 390—is displayed in FIG. 7, whose architecture is assumed to be fixed for all entities. The quantum state is initialized as a pure state $|00 \ldots 0\rangle$, say a 6-qubit system. Hence, a predefined intial un-superimposed state 701 is used. Afterwards, in module 725 Hadamard gates 761 act on each qubit to create the maximal superposition $H_{6,\ldots,1}|0\rangle := H_6 H_5 \ldots H_1 |0\rangle$. Then a entity-specific parameterized unitary circuit 720 generates the quantum representation from the superposition, $$|e_i\rangle = U_{e_i} H_{6,\ldots,1} |0\rangle, \text{ with } i=1,\ldots,N_e, \quad (10)$$

where $U_{e_i}$ is set to have the same design as $U_{p_i}$ in Eq. 4. The values of the parameters (defining a rotation in 2-D Hilbert space, see Eq. 3) are dependent on the respective subject or object, respectively. In order to harvest the quantum advances, the circuit depth should be low and in the order of log(R). In this way, the experiments only need to be repeated $\vartheta(\log R/\epsilon_2)$ times to update the model parameters given one training sample, where $\epsilon$ is the accuracy required to estimate the statistics of the ancilla qubit. The subject quantum state 205 generated via unitary circuit evolution can then be evolved through the parameterized quantum circuit 220, cf. FIG. 4.

As will be appreciated, in the fQCE example, the classical data structure $\mathcal{T}$ of QCE example is replaced by variational unitary circuits. In this way, the quantum states $|s\rangle$ or $|o\rangle$ can be prepared via unitary circuits evolution, instead of quantum querying of the classical data structure τ. (for more details see Theorem A.1 and FIG. 1 in [8]). Note that the circuit architecture as illustrated in FIG. 7 may be fixed for all entities (subjects and objects). The unitary parameterized circuit out of five blocks: Hadamard gates 761 in module 725 on all qubits to create superposition from the initial pure state $|0 \ldots 0\rangle$, single qubit gates 762, controlled two-qubit gates with control range 1, 2, and 3 763-765.

In the fQCE example, it is also possible to determine the value function using techniques as described above with respect to the QCE example, specifically in connection with FIG. 6. Thus, in the fQCE example, it is also possible to determine the value function by determining the overlap between (i) the object quantum state 390 (prepared based on an evolution of the initial pure state 701 through the quantum circuit 700 having respective values for the parameters of the various quantum gates 761-765 of the modules 721-725 that correspond to the respective object) and (ii) the subject-predicate quantum state 290 (prepared, first, on an evolution of the initial pure state 701 through the quantum circuit 700 having respective values for the parameters of the various quantum gates 761-765 of the modules 721-725 that correspond to the respective subject and, second, evolving the thereby obtained subject state through the quantum circuit 220 having respective values for the parameters of the various quantum gates 251-254 of the modules 221-224 correspond to the respective predicate). Specifically, the overlap can be determined by measuring the statistics of the ancilla qubit 400 (cf. FIG. 6), that correspond on the respective subject-predicate quantum state 290 and the object quantum state 390.

Still further, it would be possible to determine the gradient of the gradient descent technique using the shifted values for the parameters, as explained above in connection with Eq. 9A, for the quantum circuits 220, 700, and the statistics of the ancilla qubit 400.

Thus, generally speaking, a respective further subject quantum state representing the respective subject can be prepared based on a further first evolution of the first predefined initial un-superimposed quantum state 701 through the parameterized quantum circuit 700, respective further values of the first parameters of the first quantum circuit 700 depending on the respective subject and a first predefined shift depending on an orientation of the respective gradient (cf. Eq. 9A). Also, the respective further subject quantum state can be evolved through the respective parameterized quantum circuit 220, respective further values of the second parameters of the second quantum circuit depending on the respective predicate and a second predefined shift depending on the orientation of the respective gradient (cf. Eq. 9A). Still further, the respective further object quantum state representing the respective object can be prepared based on a further second evolution of the predefined initial un-superimposed quantum state 701 through the parameterized quantum circuit 700, respective further values of the third parameters of the third quantum circuit depending on the respective object and a third predefined shift depending on the orientation of the respective gradient (cf. Eq. 9A).

FIG. 8 schematically illustrates a quantum machine 3000 that can be used to implement techniques as described herein. The quantum machine 3000 includes an input interface 3001 that can be used to receive classical data, e.g., labeled training data of semantic triples. The quantum machine 3000 also includes a memory 3004 and one or more quantum circuits 3002. For example, one and the same parametrized quantum circuit 3002 may be used for implementing the quantum circuit 700 (cf. FIG. 7) used to prepare the subject quantum state 205 and the object quantum state 390 in connection with determining the value function and also used to prepare the further subject quantum state and the further object quantum state in connection with determining the gradient of the gradient descent iterate of optimization technique of the KG training. Also, the parametrized quantum circuit 3002 can implement the quantum circuit 220 used for evolving the subject quantum state 205 to obtain the subject-predicate quantum state 290. Further parametrized quantum circuits of the quantum machine 3000 may also include the ancilla qubit 400 (cf. FIG. 6). Finally, the quantum machine 3000 includes an output 3003 that can be used to provide the trained KG 100, e.g., for querying and inferring.

The quantum machine 3000 can implement the method of FIG. 3. Thereby, it is possible to accelerate the training of KGs and—as will be described below—the inference tasks implemented on KGs.

Dealing with an ever-increasing size of KGs is a huge industrial challenge. For example, noisy intermediate-scale quantum processing units implementing the quantum machine 3000 can implement quantum machine learning algorithms for training and inference on the ever-increasing KGs. Those and other tasks can be dramatically accelerated compared to conventional computers.

Next, a few advantages of the techniques described herein are described.

Advantage one: Comparable results with other classical embedding methods

For evaluating the performance of the examples described above, we use four link prediction datasets of different sizes: Kinship [1], FB15k-237 [14], WN18RR [6], and GDELT [9].

Kinship This database contains relations between family members. An example of the triple is (Max, husband_of Marry)

FB15k-237 This is a small subset of Freebase with 237 predicates. Most of the triples are related to the facts of cities, movies, sports, and musics, e.g., (California, located_in, U.S.).

GDELT The Global Database of Events, Language and Tone (GDELT) monitors evens between different countries and organizations. An example entry could be (ESA, collaborates_with, NASA).

WN18RR This hierarchical knowledge base is a subset of WordNet which consists of hyponym and hypernym relations between words, e.g., (pigeon, hyponym_of, bird)

The exact statistics of datasets are listed in Table 1, including the total amount of triplets in the dataset #D, the number of entities Ne, and the number of predicates Np.

TABLE 1

Statistics of KGs

|  | #$\mathcal{D}$ | $N_e$ | $N_p$ |
|---|---|---|---|
| KINSHIP | 10,790 | 104 | 26 |
| WN18RR | 79,043 | 39462 | 18 |
| FB15K-237 | 310,079 | 14,505 | 237 |
| GDELT | 497,603 | 6785 | 230 |

Since all the above mentioned datasets only consist of positive (true) semantic triples, we generated negative (false) instances according to the protocol of corrupting semantic triples in [2]: negative semantic triples are drawn by corrupting the object o to a different entity o', and similarly corrupting subject s to s'. This corruption scheme makes a local-closed world assumption, meaning that the Knowledge Graph is assumed to be only locally connected. Thus, unobserved and corrupted semantic triples are treaded as false during the training.

The model performance is quantified using the following metrics on the test dataset. Let us consider a semantic triple (s,p,o) in the test dataset. To evaluate the retrieval of the object o given the subject s and the predicate p, we replace the object o with every other possible object o'; compute the value of $\eta_{spo'}$; sort them in a decreasing order; and locate the position of the target object o which is referred to as the rank with respect to the target object. We provide the filtered ranking scores as in [2] by removing all semantic triples (s, p, o') with $y_{spo}$=1 and o'≠o. Filtered ranking scores eliminate the ambiguity during retrieval and provide a clearer performance evaluation of the models. Similarly, we also evaluated the retrieval of subject s by ranking the $\eta_{s'pc}$ for all possible subjects s'.

To quantify the performance of the classical or quantum models on missing links predication, we report three measures: mean rank (MR), Hits@3, and Hits@10 in Table. 2. During the training, the datasets were randomly split into training, validation, and test sets. For a fair comparison, classical and quantum models are optimized by minimizing the MSE loss. More specifically, classical models use the regularized loss, Eq. 1, while quantum circuit models use Eq. 8 taking the targets $y_t\epsilon\{1,-1\}$.

The dimension of latent representations for all classical baselines is chosen as R=64, which corresponds to a 6-qubit system. Thus, circuits algorithms for knowledge graph embedding are evaluated on the 6-qubit system. In addition, the row best known in Table 2 shows the best results reported in the literatures.

Early stopping on the validation set was used to avoid overfitting by monitoring the filtered His@3 entity recall scores every 20 epochs. Before training, all model parameters are randomly initialized. In particular, we found that the model performance is relatively sensitive to the initialization of gates parameters. Overall, the gates parameters are initialized uniformly from the interval $$\left[-\frac{\pi}{10}, \frac{\pi}{10}\right].$$

TABLE 2

Filtered recall scores evaluated on Kinship and WN18RR datasets. Four metrics are compared: Mean Rank (MR), Hits@3 (@3), and Hits@10 (@10).

|  | KINSHIP | | | WN18RR | | |
|---|---|---|---|---|---|---|
| Methods | MR | @3 | @10 | MR | @3 | @10 |
| RESCAL | 3.2 | 88.8 | 95.5 | 12036 | 21.3 | 25.0 |
| DISTMULT | 4.5 | 61.0 | 87.7 | 10903 | 21.0 | 24.8 |
| QCE | 3.6 | 73.8 | 93.8 | 3655 | 19.5 | 32.3 |
| FQCE | 3.6 | 73.1 | 94.0 | 2160 | 27.4 | 37.8 |

TABLE 3

Filtered recall scores evaluated on FB15k-237 and GDELT datasets. Four metrics are compared: Mean Rank (MR), Hits@3 (@3), and Hits@10 (@10).

|  | FB15K-237 | | | GDELT | | |
|---|---|---|---|---|---|---|
| Methods | MR | @3 | @10 | MR | @3 | @10 |
| RESCAL | 291.3 | 20.7 | 35.1 | 185.0 | 10.4 | 22.2 |
| DISTMULT | 305.4 | 23.4 | 39.1 | 130.4 | 12.1 | 24.5 |
| QCE | 258.7 | 22.5 | 35.0 | 128.8 | 12.5 | 23.8 |
| FQCE | 236.0 | 19.8 | 33.7 | 131.0 | 10.8 | 24.1 |

As we can see, quantum models achieve state of the art results on the WN18RR dataset, and comparable results on other datasets.

Advantage two: tolerate to the model noises

QCE, and fQCE use parametric gates, and the model performance is relatively insensitive to the system noises, for example, the noises from loading the data, or the noises from the measurement of ancilla qubit. This is because the parameters are learned by minimizing the loss via back-propagation. This is type of learning algorithm always bring the model to flat minima of the loss function. Thus, after minimization, the model is relatively tolerant to the system noise. Therefore, it can be tested on near-term intermediate-scale noisy quantum devices.

Let us compare QCE or fQCE with one important class of quantum machine learning algorithm, the quantum recommendation system [8]. Recall that our models (QCE and fQCE) are used for knowledge graph completion, while the quantum recommendation system is a quantum machine learning algorithm for preference matrix completion. Note that knowledge graph can be considered as a one-dimensional higher generalization of preference matrix. So, even we had a quantum knowledge graph algorithm which uses the similar technique as in the quantum recommendation system, it will suffer from the noise of the quantum system. Thus, these types of quantum algorithms cannot be tested or applied on near-term intermediate-scale noisy quantum devices.

Advantage three: reduced computation complexity

The other advantage of our models is the reduced computational complexity of evaluating the value function $\eta_{spo}$. In the classical model, evaluation of the value function for the DistMult model requires $\vartheta(R)$ steps of classical computation, while for the RESCAL model it requires $\vartheta(R^2)$ steps. However, in the case of quantum circuit models, they only require $\vartheta(\log R)$ steps of quantum operations, including loading the data, and acting parametric quantum gates on qubits.

On the other hand, there is another acceleration we have not discussed, namely the acceleration when it comes to find the most relevant candidates to an inference task, i.e., during the query/inference phase 1002 (cf. FIG. 2). To be more specific, given the incomplete semantic triple (s,p,•), the inference task is to find which entity is the best (or most possible) candidate for the unknown object.

Why is this a challenging task? This is because the size of KG is consistently growing, as the KG gather and merge information from across all kinds of information resources. In other words, the number of distinguishable entities increases consistently. This causes problems to the classical models, e.g., DistMult, RESCAL. This is because, classical models first evaluate the indicator function $\eta_{spe_i}$, i=1, . . . , $N_e$ with respect to all the entities. Afterwards, classical models find the largest value in order to locate the most possible candidate for the unknown object. This is very time consuming, since classical models have to evaluate the indicator function $N_e$ times, where $N_e$ is the number of distinguishable entities in the knowledge graph. Each time of evaluation requires $\vartheta(R)$, or $\vartheta(R^2)$ steps of classical operations (see the above paragraph).

Inferring an object of a given one of the plurality of semantic triples in the test dataset (or likewise, inferring a subject) can be accelerated based on measuring conditioned statistics O(R) of the ancilla qubit 401 (cf., FIG. 6, where Haramard gates 401 and 402 and module 410 can be reused for the interference task, but the conditioning is different). This is explained in detail hereinafter:

First, we prepare the quantum state $$\sum_{i=1}^{N_e} (|0\rangle_A |i\rangle |e_i\rangle + |1\rangle_A |i\rangle |sp\rangle), \quad (11)$$

where the first qubit with subscript A is the ancilla qubit; the second register $|i\rangle$ with i=1, . . . , $N_e$ are just binary representations of the entity index, e.g., $|10|10\rangle$ indicates the 10-th entity (so-called index register). The third register (either in state $|e_i\rangle$ or $|sp\rangle$) is generated with condition on the ancilla and the second register. More specifically, if the ancilla in state $|1\rangle$ the third register is generated in the subject-predicated quantum state $|sp\rangle$ 290 regardless on the state of the second register, while if the ancilla in state $|0\rangle$ the third register will be created as $|e_i\rangle$—i.e., further quantum states of the entities—according to the state of the second register.

Then, we perform the Hadamard transform on the ancilla qubit (Hadamard quantum gate 402 in FIG. 6), then we have $$\sum_{i=1}^{N_e} (|0\rangle_A |i\rangle(|e_i\rangle + |sp\rangle) + |1\rangle_A |i\rangle(|e_i\rangle - |sp\rangle)), \quad (12)$$

up to a normalization constant. Measuring the ancilla qubit and conditioned on the state $|0\rangle_A$ leads to the final quantum state $$\sum_{i=1}^{N_e} |i\rangle(|e_i\rangle + |sp\rangle). \quad (13)$$

We further measure the quantum state of the index register in Eq. 13. In particular, the probability of measuring the index register in Eq. 13 being in the state $|i\Phi$ is given by $$Pr(|i\rangle) \propto \tfrac{1}{2} + \tfrac{1}{2}\eta_{spe_i}, \quad (14)$$

where $\eta_{spe_i}$ is the value function for quantum models in both examples, QCE or fQCE. Therefore, in the quantum model in order to infer the best candidate for the unknown object, it is not necessary to evaluate all the value functions with respect to every entity. It can be sampled from the quantum state, Eq. 13. In particular, since the targets in the quantum embedding models are set as $y_i \in \{1, -1\}$, after training model, most probable entity should have, in principle, the largest indicator function, which means it will be sampled with the highest probability.

Although embodiments of the invention have been shown and described with respect to certain preferred embodiments, equivalents and modifications will occur to others skilled in the art upon the reading and understanding of the specification.

For illustration, various examples have been described in which an object of a semantic triple is inferred. Similar techniques may be readily applied to inferring a subject of a semantic triple.

For further illustration, various techniques have been described in which a subject quantum state is evolved through a parametrized quantum circuit, in order to obtain a subject-predicate quantum state. In other examples, an object quantum state may be evolved through the parametrized quantum circuit, in order to obtain an object-predicate quantum state.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

REFERENCES

[1] Arthur Asuncion and David Newman. Uci machine learning repository, 2007.
[2] Antoine Bordes, Nicolas Usunier, Alberto Garcia-Duran, Jason Weston, and Oksana Yakhnenko. Translating embeddings for modeling multirelational data. In Advances in neural information processing systems, pages 2787-2795, 2013.

[3] Harry Buhrman, Richard Cleve, John Watrous, and Ronald De Wolf. Quantum fingerprinting. Physical Review Letters, 87(16):167902, 2001.

[4] Pedro Chamorro-Posada and Juan Carlos Garcia-Escartin. The switch test for discriminating quantum evolutions. arXiv preprint arXiv:1706.06564, 2017.

[5] Andrew M Childs and Nathan Wiebe. Hamiltonian simulation using linear combinations of unitary operations. arXiv preprint arXiv:1202.5822, 2012.

[6] Tim Dettmers, Pasquale Minervini, Pontus Stenetorp, and Sebastian Riedel. Convolutional 2d knowledge graph embeddings. arXiv preprint arXiv:1707.01476, 2017.

[7] Juan Carlos Garcia-Escartin and Pedro Chamorro-Posada. Swap test and hong-ou-mandel effect are equivalent. Physical Review A, 87(5):052330, 2013.

[8] Iordanis Kerenidis and Anupam Prakash. Quantum recommendation systems. arXiv preprint arXiv:1603.08675, 2016.

[9] Kalev Leetaru and Philip A. Schrodt. Gdelt: Global data on events, location, and tone. ISA Annual Convention, 2013.

[10] Yunpu Ma, Márcel Hildebrandt, Stephan Baier, and Volker Tresp. Holistic representations for memorization and inference.

[11] Maximilian Nickel, Volker Tresp, and Hans-Peter Kriegel. A three-way model for collective learning on multi-relational data. 2011.

[12] Max F Riedel, Daniele Binosi, Rob Thew, and Tommaso Calarco. The european quantum technologies flagship programme. Quantum Science and Technology, 2(3): 030501, 2017.

[13] Maria Schuld, Alex Bocharov, Krysta Svore, and Nathan Wiebe. Circuitcentric quantum classifiers. arXiv preprint arXiv:1804.00633, 2018.

[14] Kristina Toutanova and Danqi Chen. Observed versus latent features for knowledge base and text inference. In Proceedings of the 3rd Workshop on Continuous Vector Space Models and their Compositionality, pages 57-66, 2015.

[15] Bishan Yang, Wen-tau Yih, Xiaodong He, Jianfeng Gao, and Li Deng. Embedding entities and relations for learning and inference in knowledge bases. arXiv preprint arXiv:1412.6575, 2014.

The invention claimed is:

1. A method of training a knowledge graph, the knowledge graph comprising links implementing a plurality of predicates and further comprising entities implementing a plurality of subjects and a plurality of objects, the plurality of subjects and the plurality of predicates and the plurality of objects forming semantic triples, wherein the method comprises:

for each one of a plurality of semantic triples of labeled training data, determining a respective value function by:

preparing a respective subject quantum state representing the respective subject based on a first evolution of a first predefined initial un-superimposed quantum state through a parameterized first quantum circuit, respective values of first parameters of the first quantum circuit depending on the respective subject, evolving the respective subject quantum state through a respective parameterized second quantum circuit, values of second parameters of the second quantum circuit depending on the respective predicate, to thereby obtain a subject-predicate quantum state, preparing a respective object quantum state representing the respective object based on a second evolution of a second predefined initial un-superimposed quantum state through a parameterized third quantum circuit, values of third parameters of the third quantum circuit depending on the respective object, and determining a respective overlap between the respective object quantum state and the respective subject-predicate quantum state, wherein the method further comprises:

performing an iterative optimization of the value functions of the plurality of semantic triples based on a loss function defined with respect to a difference between the value functions and labels of the labeled training data.

2. The method of claim 1, wherein at least one of the first quantum circuit, the second quantum circuit, and the third quantum circuit comprises single qubit gates for each qubit of a respective input quantum state and one or more two-qubit gates for one or more combinations of qubits of respective input quantum states.

3. The method of claim 1, wherein the first quantum circuit comprises Hadamard qubit gates for each qubit of the first predefined initial un-superimposed quantum state.

4. The method of claim 1, wherein the third quantum circuit comprises Hadamard qubit gates for each qubit of the third predefined initial un-superimposed quantum state.

5. The method of claim 1, wherein the first parameters, the second parameters, and the third parameters are associated with rotations in two-dimensional Hilbert space.

6. The method of claim 1, wherein the method further comprises for each one of the plurality of semantic triples of the labeled training data:

measuring statistics on an ancilla qubit to determine the respective overlap, wherein the statistics depend on the subject-predicate quantum state and the object quantum state.

7. The method of claim 1, wherein said performing of the iterative optimization comprises updating the value functions using a gradient descent technique, wherein the method further comprises for at least some of the value functions:

calculating a respective gradient of the respective value function by measuring statistics on an ancilla qubit, wherein the statistics depend on a further subject-predicate quantum state and a further object quantum state.

8. The method of claim 7, wherein the method further comprises for the at least some of the value functions:

preparing a respective further subject quantum state representing the respective subject based on a further first evolution of the first predefined initial un-superimposed quantum state through the parameterized first quantum circuit, respective further values of the first parameters of the first quantum circuit depending on the respective subject and a first predefined shift depending on an orientation of the respective gradient, evolving the respective further subject quantum state through the respective parameterized second quantum circuit, respective further values of the second parameters of the second quantum circuit depending on the respective predicate and a second predefined shift depending on the orientation of the respective gradient, to thereby prepare the respective further subject-predicate quantum state, preparing the respective further object quantum state representing the respective object based on a further second evolution of the second predefined initial un-superimposed quantum state through the parameterized third quantum circuit, respective further values of the third parameters of the third quantum circuit depending on the respective object and a third predefined shift depending on the orientation of the respective gradient.

9. The method of claim 1, further comprising:
inferring an object of a given one of the plurality of semantic triples of the labeled training data based on measuring statistics of an ancilla qubit and an index register of the entities, wherein the statistics depend on the respective subject-predicate quantum state and further quantum states of the entities.

10. The method of claim 1, wherein the first quantum circuit, the second quantum circuit, and the third quantum circuit all have the same circuit architecture.

11. A method of training a knowledge graph, the knowledge graph comprising links implementing a plurality of predicates and further comprising entities implementing a plurality of subjects and a plurality of objects, the plurality of subjects and the plurality of predicates and the plurality of objects forming semantic triples,
wherein the method comprises:
for each one of a plurality of semantic triples of labeled training data, determining a respective value function by:
preparing a respective subject quantum state representing the respective subject based on a classical representation of the respective subject,
evolving the respective subject quantum state through a respective parameterized quantum circuit, values of parameters of the quantum circuit depending on the respective predicate, to thereby obtain a subject-predicate quantum state,
preparing a respective object quantum state representing the respective object based on a further classical representation of the respective object,
determining a respective overlap between the respective object quantum state and the respective subject-predicate quantum state,
wherein the method further comprises:
performing an iterative optimization of the value functions of the plurality of semantic triples based on a loss function defined with respect to a difference between the value functions and labels of the labeled training data.

12. The method of claim 11, wherein the quantum circuit comprises single qubit gates for each qubit of a respective input quantum state and one or more two-qubit gates for one or more combinations of qubits of respective input quantum states.

13. The method of claim 11, wherein the parameters are associated with rotations in two-dimensional Hilbert space.

14. The method of claim 11, wherein the method further comprises for each one of the plurality of semantic triples of the labeled training data:
measuring statistics on an ancilla qubit to determine the respective overlap, wherein the statistics depend on the subject-predicate quantum state and the object quantum state.

15. The method of claim 11, wherein said performing of the iterative optimization comprises updating the value functions using a gradient descent technique,
wherein the method further comprises for at least some of the value functions:
calculating a respective gradient by using a classical representation of the respective entities.

16. A quantum machine is configured for training a knowledge graph, the knowledge graph comprising links implementing a plurality of predicates and further comprising entities implementing a plurality of subjects and a plurality of objects, the plurality of subjects and the plurality of predicates and the plurality of objects forming semantic triples,
wherein quantum machine is configured to execute:
for each one of a plurality of semantic triples of labeled training data, determining a respective value function by:
preparing a respective subject quantum state representing the respective subject based on a first evolution of a first predefined initial un-superimposed quantum state through a parameterized first quantum circuit, respective values of first parameters of the first quantum circuit depending on the respective subject,
evolving the respective subject quantum state through a respective parameterized second quantum circuit, values of second parameters of the second quantum circuit depending on the respective predicate, to thereby obtain a subject-predicate quantum state,
preparing a respective object quantum state representing the respective object based on a second evolution of a second predefined initial un-superimposed quantum state through a parameterized third quantum circuit, values of third parameters of the third quantum circuit depending on the respective object, and
determining a respective overlap between the respective object quantum state and the respective subject-predicate quantum state,
wherein the quantum machine is further configured to execute:
performing an iterative optimization of the value functions of the plurality of semantic triples based on a loss function defined with respect to a difference between the value functions and labels of the labeled training data.

* * * * *